US006134774A

United States Patent [19]

Williams et al.

[11] Patent Number: 6,134,774

[45] Date of Patent: *Oct. 24, 2000

[54] CLAMP FOR CLAMPING COAXIAL CABLE CONNECTORS TO COAXIAL CABLES

[76] Inventors: Deborah Williams; Forest Williams, both of 4820 Powell Rd., Fairfax, Va. 22032

[ * ] Notice: This patent issued on a continued prosecution application filed under 37 CFR 1.53(d), and is subject to the twenty year patent term provisions of 35 U.S.C. 154(a)(2).

[21] Appl. No.: 08/805,579

[22] Filed: Feb. 25, 1997

Related U.S. Application Data

[63] Continuation-in-part of application No. 08/386,826, Feb. 10, 1995, Pat. No. 5,660,565.

[60] Provisional application No. 60/012,557, Feb. 29, 1996.

[51] Int. Cl.[7] ..................... B23P 19/00

[52] U.S. Cl. ..................... 29/753; 29/751; 29/828; 29/278; 294/114

[58] Field of Search ..................... 29/268, 751, 753, 29/828, 278, 280; 81/9.42; 294/114, 1.1; 226/173, 192, 163, 164, 165

[56] References Cited

U.S. PATENT DOCUMENTS

| | | | |
|---|---|---|---|
| 1,520,716 | 3/1924 | Judd | 294/114 |
| 2,786,095 | 3/1957 | Arbeiter | 29/828 X |
| 3,325,885 | 6/1967 | Ziegler et al. | 29/280 |
| 3,559,448 | 2/1971 | Illingworth et al. | 29/280 |
| 3,642,186 | 2/1972 | Nemeth et al. | 226/164 |
| 3,690,534 | 9/1972 | Biron | 226/173 |
| 4,462,626 | 7/1984 | Heidemann | 294/114 |
| 4,624,726 | 11/1986 | Harper | 226/173 |
| 4,633,699 | 1/1987 | Fuchs | 226/173 |
| 4,765,176 | 8/1988 | Geisser | 29/751 X |
| 5,211,049 | 5/1993 | Lucas | 29/268 X |
| 5,214,832 | 6/1993 | Koehler et al. | 29/280 |
| 5,392,508 | 2/1995 | Holliday et al. | 29/751 |
| 5,469,613 | 11/1995 | McMills et al. | 29/751 |
| 5,582,078 | 12/1996 | Talley | 81/9.42 |
| 5,596,800 | 1/1997 | Holliday et al. | 72/409.01 |
| 5,647,119 | 7/1997 | Bourbeau et al. | 29/751 |

*Primary Examiner*—Lee Young
*Assistant Examiner*—A. Dexter Tugbang
*Attorney, Agent, or Firm*—Whitham, Curtis & Whitham

[57] ABSTRACT

A coaxial cable connector includes a housing made from an electrically conductive material and a hollow, cylindrical sleeve extending from a first end of the housing. The sleeve is constructed from a material which is deformable onto a coaxial cable. An inner conductor connector projects from the first end of the housing at a point centrally positioned within the hollow, cylindrical sleeve. Insulation is positioned between the housing and the inner conductor connector from the housing, and an outer conductor connector projects from the first end of the housing at a point positioned with the hollow, cylindrical sleeve between the inner conductor connector and the hollow, cylindrical sleeve.

9 Claims, 3 Drawing Sheets

12
14
16
18
20
22
23
24
25
26
27
28
29
30
32
34
38
40
42
44
46
48
50
53
54
60
62
63
64
66
68
72
74
76

CLAMP FOR CLAMPING COAXIAL CABLE CONNECTORS TO COAXIAL CABLES

CROSS-REFERENCE TO RELATED APPLICATIONS

This application is a continuation of the provisional patent application having U.S. Ser. No. 60/012,557 filed Feb. 29, 1996, and a continuation-in-part (CIP) application of the co-pending application having Ser. No. 08/396,826 filed Feb. 10, 1995, now U.S. Pat. No. 5,660,565 and the complete contents of both applications is herein incorporated by reference.

BACKGROUND OF THE INVENTION

1. Field of the Invention

The invention is generally related to cable connectors for providing electrical connections to and between coaxial cables.

2. Description of the Prior Art

Coaxial cable has become widely used in recent years for a variety of applications including the delivery and distribution of television signals, electronic communications, distributed data networks, and in other uses. Coaxial cables include both an inner conductor, which is typically responsible for transmitting signals, and an outer conductor which encircles the inner conductor and is typically in the form of wire mesh, sometimes also with a foil covering. In many applications, this outer connector mesh is used to electronically shield the inner conductor and is sometimes referred to as the "cable sheath". The name "coaxial cable" is derived from the fact that the inner conductor and outer conductor run along the same axis within the cable. Coaxial cables typically include the aforementioned inner and outer conductors, with insulation in between, and also include a protective sheath or jacket on the external surface of the cable.

A wide variety of devices have been developed for making electrical connections to the inner and outer connectors. For example, coaxial cable connectors are described in U.S. Pat. No. 4,374,458 to Komada; U.S. Pat. No. 4,352,240 to Komada; U.S. Pat. No. 4,593,964 to Forney et al.; U.S. Pat. No. 4,904,204 to Heng et al.; U.S. Pat. No. 4,915,651 to Bout; U.S. Pat. No. 4,952,174 to Sucht et al.; U.S. Pat. No. 5,024,606 to Ming-Hwa; U.S. Pat. No. 5,011,432 to Sucht et al.; U.S. Pat. No. 5,061,207 to Wright; U.S. Pat. No. 5,181,861 to Gaver et al.; U.S. Pat. No. 5,207,602 to McMills et al.; and U.S. Pat. No. 5,217,392 to Hosler. There are several disadvantages with cable connectors in use today (including F, bNc, N, SMA and others) and those shown in the above prior art. For example, they typically include many different parts, require stripping operations to be performed on the cable end, and do not provide a quick installation feature along with a simple method to prevent water or debris from adversely affecting the cable conductors. The current invention obviates all of the aforementioned disadvantages, and can be applied to all sizes of coaxial cable and all types of connectors.

SUMMARY OF THE INVENTION

It is therefore the overall object of this invention to provide a simple, cost-effective, reliable all-weather coaxial cable connector, for indoor or outdoor use.

It is another object of this invention to provide a simple design for the coaxial cable connector with as few parts as possible for ease of manufacturing, assembly, installation and reliability, all with less cost.

It is yet another objective to decrease installation costs by minimizing required labor-hours for installation, by not requiring the stripping of cables, by increasing both speed and accuracy through external alignment features on the connector body, and not having to provide "shrink wrap" plastic covering over the installed connector to assist in weather-proofing.

It is still another objective to provide a coaxial cable connector with simple and effective long-term weather resistance by protecting the signal wire and cable sheath from fluid and debris through close contact of internal conductive parts, and crimping of the outer connector sleeve to close and seal over the cable outer covering.

According to the invention, a coaxial cable connector composed of a minimal number of parts is used to provide a quick and effective connection with the inner and outer conductors of a coaxial cable. The cable connector has a centrally located needle-shaped probe for receiving the centrally located signal wire of a coaxial cable. A lubricant can be employed on the needle-shaped probe to aid in sliding the signal wire into the probe and sliding the probe between the insulation of the coaxial cable and the signal wire. The lubricant might also provide additional element-resistance, whether indoors or out. The coaxial cable connector includes a cable sheath connector for establishing an electrical connection between the cable sheath or "wire mesh" of the coaxial cable. The cable sheath connector projects from a connector housing and is spaced a fixed distance from the needle-shaped probe which receives the signal wire, such that when the needle-shaped probe slides between the cable insulation and the signal connector wire to make a connection with the cable signal wire, the cable sheath connector slides between the cable insulation and the cable sheath or wire mesh of the coaxial cable and establishes a connection with the cable sheath. In one embodiment, the cable sheath connector is a concentric hollow cylinder which encircles the needle-shaped probe. In another embodiment, the cable sheath connector is comprised of one or more projecting points which project from the coaxial cable connector housing parallel to the needle-shaped probe. The needle-shaped probe which is connected to the signal wire is electrically isolated from the cable sheath by the insulation present in the coaxial cable and by insulation within the connector positioned between the coaxial cable connector housing and the needle-shaped probe. The coaxial cable connector also includes a protective sleeve which projects from the coaxial cable connector housing and which encircles both the needle-shaped probe and the cable sheath connector. Once the coaxial cable is slid into the protective sleeve and electrical contacts between the needleshaped probe and the signal wire, and between the cable sheath connector and the cable sheath or wire mesh are established, the protective sleeve is crimped down tightly against the side exterior of the coaxial cable. The crimping action deforms the protective sleeve and causes it to tightly grip, and to seal over, the outer covering of the coaxial cable. A crimping tool can be used to quickly establish the connection. Preferably, the crimping tool includes a pair of jaws which possess a depression, or depressions, or alternately, an upward-protruding lug, or lugs, to allow alignment with a corresponding alignment feature on the coaxial cable connector housing, and a series of projections which serve to pull the cable end into the body protective sleeve and to deform the protective sleeve onto the exterior of the coaxial cable during crimping.

Specifically, and with regard to this invention, the prior art differs as follows:

U.S. Pat. Nos. 4,352,240 and 4,374,458 to Komada show coaxial cable connectors having numerous parts, and a very complex outer body. In addition, the center conductor of the Komada devices is only designed to make contact with the very end of the coaxial cable; thus alignment, and non-connection problems will stem from the Komada design.

U.S. Pat. No. 4,593,964 to Forney discloses a coaxial cable connector wherein the weather seal is very complex and established with multiple O-rings. In addition, the Forney crimpable ferrule is for strain relief only, not sealing.

U.S. Pat. No. 4,904,204 to Heng discloses an insulation piercing connector wherein a point is driven through the outer connector sheath and the insulation material to make contact with the inner conductor.

U.S. Pat. No. 4,915,651 to Bout discloses a coaxial cable connector which includes multiple components and employs spring components to move contact members in an axial direction.

U.S. Pat. Nos. 4,952,174 and 5,011,432 to Sucht et al. disclose multi-component coaxial cable connectors which require preparing the end of a cable for a compression fit element.

U.S. Pat. No. 5,024,606 to Ming-Hwa is directed to a coaxial cable connector which adds a threaded element. Its drawbacks are that stripping required for use and that multiple components are employed.

U.S. Pat. No. 5,061,207 to Wright discloses a coaxial cable connector which is multi-piece in character, and which requires stripping.

U.S. Pat. No. 5,181,861 to Gaver discloses a cable connector which uses "teeth" for outer conductor connection; also, stripping is required for use.

U.S. Pat. No. 5,207,602 to McMills discloses a connector designed for indoor use only (no weather seal) and requires stripping. In addition, gripping is by compression of annular ring.

U.S. Pat. No. 5,217,392 to Hosler is directed to a cable-to-cable splice connector which is two part female in nature. Hosler specifically requires adjustment and folding back of the shielding material.

BRIEF DESCRIPTION OF THE DRAWINGS

The foregoing and other objects, aspects and advantages will be better understood from the following detailed descriptions of the preferred embodiments of the invention with reference to the drawings, in which.

DETAILED DESCRIPTION OF THE PREFERRED EMBODIMENTS OF THE INVENTION

Figures 1, 2, 3, 4, 4A:
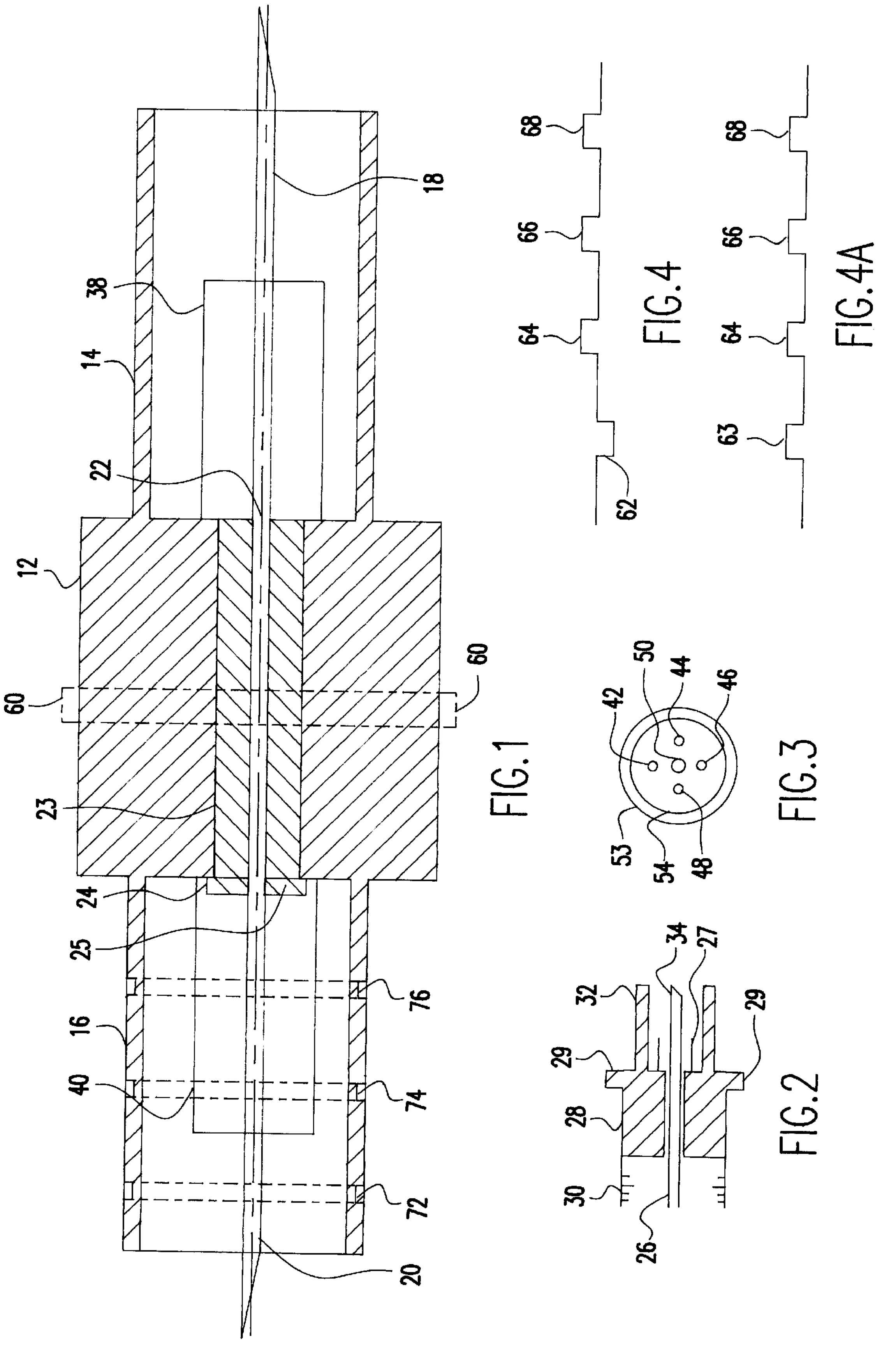
FIG. 1 is a cross-sectional side view of a coaxial cable connector according to one embodiment of this invention.
FIG. 2 is a side view of a coaxial cable connector which includes a male jack or mechanical connector at the opposite end.
FIG. 3 is an end view of a coaxial cable connector which includes projection points for establishing a connection to the cable sheath or wire mesh of a coaxial cable.
FIG. 4 is a side view, in profile, of a jaw of a crimping tool having multiple projections and an alignment depression to align with corresponding projection on connector housing.
FIG. 4*a* is a side view, in profile, of a jaw of a crimping tool having multiple projections and an alignment projection to align with corresponding depression on a connector housing.

FIG. 1 shows a coaxial cable connector 10 which includes the features of this invention. Specifically, the coaxial connector 10 has a housing 12 with protective sleeves 14 and 16 projecting from opposite ends which fit over the end of the coaxial cables (not shown). While FIG. 1 shows a coaxial connector 10 for joining the ends of two cables, it should be understood that a coaxial cable connector of the present invention can be joined to only one coaxial cable, or to a plurality of coaxial cables, with multiple connectors, via a "splitter" and genders.

Inside the protective sleeves 14 and 16 are the ends 18 and 20 of a centrally located inner conductor connector 22. In the embodiment shown in FIG. 1, the inner conductor connector 22 is a single piece, hollow, doubleended needle which passes through the housing 12. The outer diameter of the inner conductor connector 22 may be tapered on each end to further ensure gripping and protection from the elements. Also, a part of the central portion of the inner conductor connector 22 might not be hollow, but instead be composed of solid material for strength, rigidity and/or better conductivity. Insulation 23 separates the inner conductor connector 22 from the housing 12 to electrically isolate the inner conductor connector 22. Lug 24 positioned on the insulation 23 assists in properly positioning the insulation 23 in the housing 12 during assembly of the coaxial cable connector 10. Similarly, lug 25 positioned on the inner conductor connector 22 assists in properly positioning inner conductor connector 22 in the insulation 23 during assembly of the coaxial cable connector 10 and allows the ends 18 and 20 to project the same distance from the housing 12 from opposite ends of the housing 12.

While FIG. 1 shows that the ends 18 and 20 of the inner conductor connector 22 project past the ends of the protective sleeves 14 and 16, it should be understood that the length of the ends 18 and 20 is a matter of design choice and that in some circumstances they may be designed to extend only to a point within or even with the protective sleeves 14 and 16. Having the ends 18 and 20 within the length of the protective sleeves 14 and 16 may render the coaxial cable connector 10 more safe for use by the installer. The ends 18 and 20 also may have a "sharpened" pointed tip.

An important feature of the inner conductor connector 22 is that the end portions are hollow. Thus, when a coaxial cable is inserted into the protective sleeve 14, the end 18 receives the inner conductor or "signal wire" of the coaxial cable. Providing the end 18 with a sharpened point may assist in advancing the end 18 into the coaxial cable between the insulation and the central inner conductor. In addition, coating the end 18 with a lubricant such as graphite, or an electrically conductive polymeric or non-conductive material, will enhance its ability to be advanced into the coaxial cable between the inner conductor and surrounding insulation, plus provide additional protection of the signal wire from weather and debris. After the coaxial cable end is inserted into the protective sleeve 14, the end 18 of the inner conductor connector 22 will encircle the center inner conductor of the coaxial cable to form an electrical connection.

Another important feature of the inner conductor connector 22 is that its ends 18 and 20 may have a slight taper in the outer diameter, increasing from the tip of the end points 18 and 20 toward the center of the connector housing 12. This taper further provides both a better means by which gripping is provided between the coaxial cable and the coaxial cable connector; and is a simple, effective method by which resistance to the penetration of foreign matter, water and other debris is accomplished.

FIG. 1 shows that the coaxial cable connector 10 can connect the ends of two coaxial cables in an identical fashion, wherein the inner conductor connector 22 establishes an electrical connection between the center inner conductors of both coaxial cables. In the installed configuration, the center inner conductor of each cable extends into the ends 18 and 20 of the inner conductor connector 22. The insulation 23 located between the housing and the inner conductor connector 22 and the insulation in the coaxial cable serve to electrically isolate the inner and outer conductors.

FIG. 2 shows another embodiment of the invention wherein only one coaxial cable is connected at the end of the housing 28 and the other end of the housing is connected by a mechanical jack or connector 30 to a device of interest such as a wall outlet or the like. In this particular embodiment, a male jack 30 is shown with an added signal wire protrusion 26. The protrusion 26 would be added to the opposite end of the inner conductor connector 34 and would be required for signal transmission.

Figure 5:
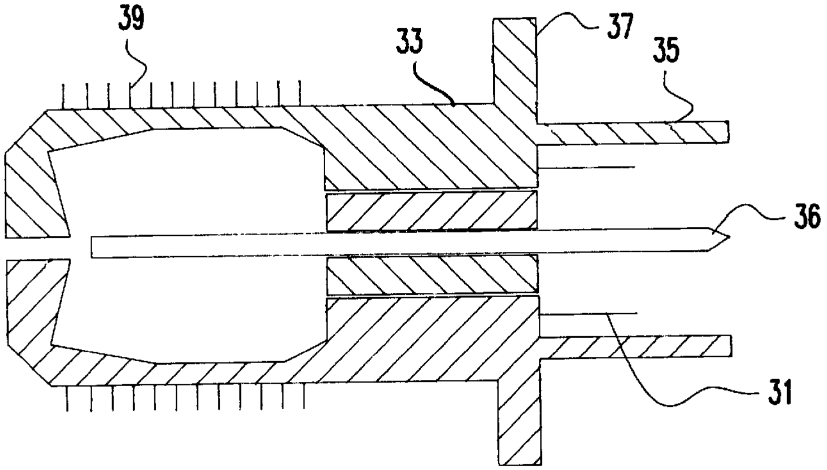
FIG. 5 is a side view of a coaxial cable connector which includes a female jack or mechanical connector at the opposite end.

FIG. 5 shows an alternative to FIG. 2, wherein a female connector 39 is provided for receiving a male jack (not shown). The two connectors shown in FIGS. 2 and 5 can also provide an alternate method to connect two coaxial cables together. As discussed above, the coaxial cable is inserted into a protective sleeve 32 (FIG. 2) or 35 (FIG. 5)(numbers 14 and 16 in the prior embodiment) with the inner conductor of the coaxial cable making electrical contact with the inner conductor connector 34 or 36 encircling the inner conductor and sliding between the inner conductor and the insulation of the coaxial cable. An alignment lug 29 or 37, or indent, both discussed above, could also be used with the embodiments in FIGS. 2 and 5, respectively. It should therefore be understood that the invention can be practiced in a wide variety of arrangements including connections between one, two or more coaxial cables, in a multiple connector "splitter", all with various genders.

With reference back to FIG. 1, positioned radially about the ends 18 and 20 are outer conductor connectors 38 and 40 which project from the housing 12. The outer conductor connectors 38 and 40 establish an electrical connection with the cable sheath or wire mesh of the coaxial cable when they are inserted into the protective sleeves 14 and 16. Preferably the outer conductor connectors 38 and 40 are positioned on the housing 12 such that they will slide between the insulation and wire mesh of the cable.

During installation, electrical connections with the inner conductor and outer conductor are simultaneously established. After installation, insulation within the cable is positioned between the inner conductor connector 22 and outer conductor connector 38.

As an alternative to the "sleeve-like" outer conductor connectors 38 and 40 which encircle the inner conductor connectors, FIG. 3 shows that one or more projection points 42, 44, 46 and 48 can be positioned a fixed radial distance from the inner conductor connector 50 which corresponds to the radial distance between the inner conductor and wire mesh or cable sheath of the coaxial cable. Like the inner conductor connector 50, the projection points 42, 44, 46 and 48 project from the housing 52 from a point inside the protective sleeve 54. Thus, when the cable end is inserted into the protective sleeve 54, electrical connections between the inner conductor of the coaxial cable and the inner conductor connector 50 and between the outer conductor of the coaxial cable and the projection points 42, 44, 46 and 48 are simultaneously established.

With reference to FIGS. 1, 2, 3 and 5, preferably the outer conductor connectors 38, 40, 27 and 31, or the projection points 42, 44, 46 and 48; as well as the protective sleeves 14, 16, 32, 35 and 54; and the housings 12, 28, 33 and 52 are made of a similar metallic or conductive, deformable composite material, and could be manufactured in a single piece. The metallic or conductive composite material will allow an electrical connection between the outer conductors of the connected coaxial cables. In addition, the metallic or conductive composite material will provide the coaxial cable connector with a toughness suitable to withstand the environmental conditions in which it could be used. A plastic film (sometimes called "shrink wrap") or other coating, though not required with this invention, can be positioned over the exterior of the coaxial cable connector to further assist in resisting environmental degradation (e.g., dust, rusting, etc.), whether used inside or out.

FIG. **4*a* shows the profile of a jaw of a crimping device that can be used to crimp the protective sleeves 14 and 16 to the ends of the coaxial cables. With references to both FIGS. I and 4a, an alignment extension 60 on the housing 12 of the coaxial cable connector 10 interacts with depression 62 in the jaw surface. This alignment extension 60 would probably be placed on the center of the housing 12, to provide symmetry for ease of installation of both sides of the connector with the same jaw. It could also be composed of multiple projections, again possibly placed symmetrically about the center. Once aligned with the jaws surrounding the entire coaxial cable connector and with the alignment extension(s) 60 positioned within the depression 62, the jaws are brought together to crimp the protective sleeve 14 and/or 16 to the coaxial cable. In one embodiment, where the jaw includes three spaced apart projections 64, 66 and 68, the protective sleeve 16 is deformed into the coaxial cable at three spaced apart locations 72, 74 and 76. The crimping action causes the end of the coaxial cable to be further drawn into the protective sleeve 16 and causes the protective sleeve to be permanently mechanically fastened to the coaxial cable end. Because the metal protective sleeve is deformed into the coaxial cable, the end of the coaxial cable inside the coaxial cable connector 10 is kept free of water, dirt and debris. Thus, the coaxial cable connector 10** of the present invention provides for both a quick, simultaneous electrical connection between the inner conductor and outer conductor of a coaxial cable, and provides for a simple and effective means to hold the connector on the coaxial cable end and prevent contamination of the inner and outer conductors by water, dirt and debris.

While FIG. **4*a* shows a jaw surface which can be used to clamp one protective sleeve, it should be understood that the jaw can have opposite projections positioned symmetrically on opposite sides of the depression 62 such that a coaxial cable connector 10, as shown in FIG. 1, can have both cable ends simultaneously crimped to two cable ends. In addition, while the projections 64, 66 and 68 are shown as approximately the same size, it should be understood that the projection sizes can be varied within the practice of this invention. For example, if the projections are made to be progressively larger at points farther away from the alignment depression, the jaw may have an enhanced ability to draw the cable end into the protective sleeve 14 or 16**.

It should be further understood that, though the coaxial cable connector alignment mechanism is shown to be a projection 60 from the housing 12 with a corresponding depression in the jaw surface 62, these traits could be reversed, and an alignment "indentation" (or multiple indentations) in the connector housing 12 could be used with corresponding "projection(s)" on the jaw device 63 as shown in FIG. 4*b*.

Figure 6A:
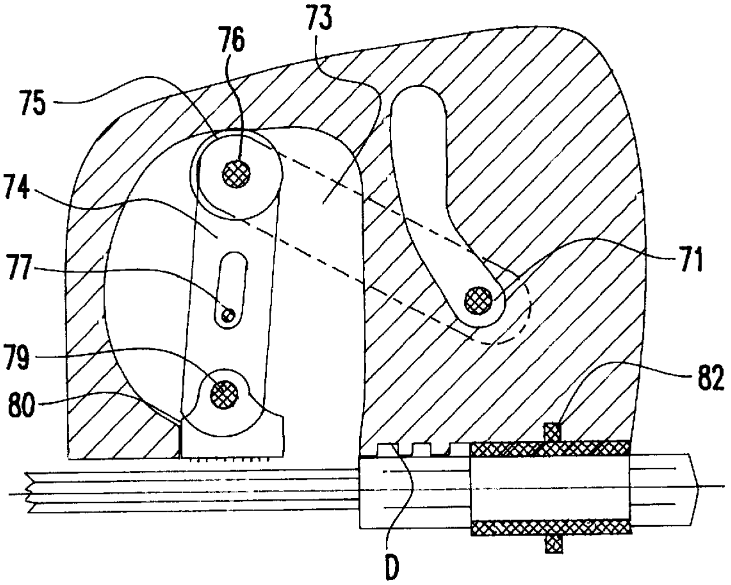
FIGS. 6*a–d* are sequential cross-sectional side views of a jaw member used to seat a coaxial cable in a coaxial cable connector of this invention, and then clamp the coaxial cable connector; and the coaxial cable.
Figure 6B:
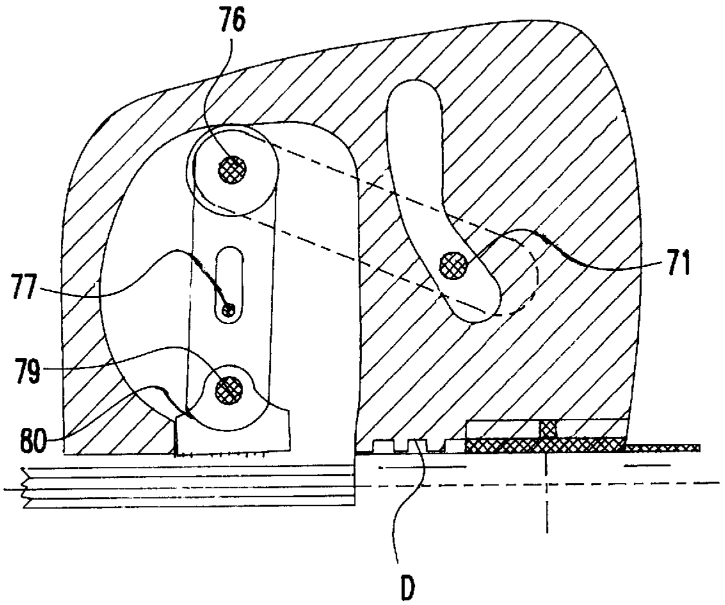
Figure 6C:
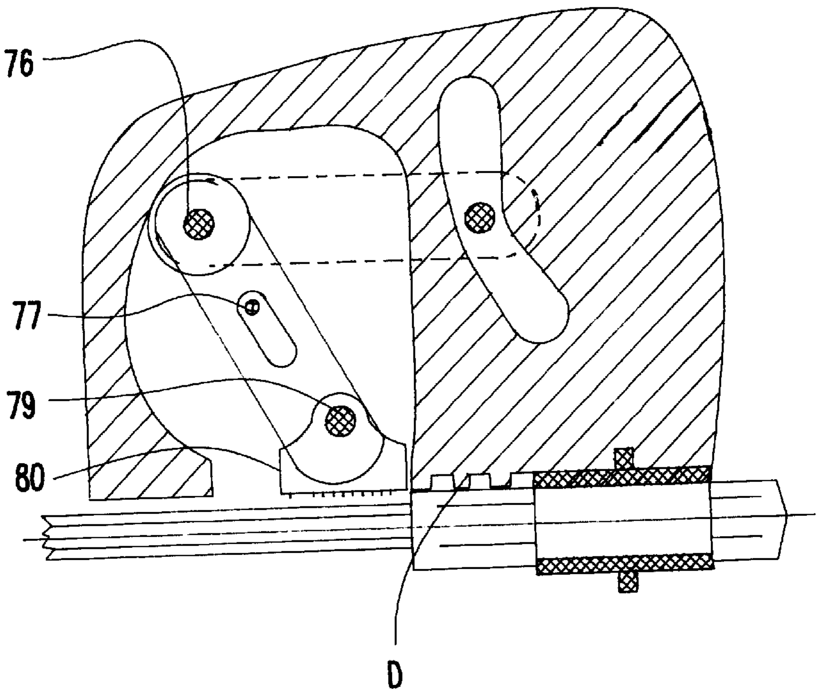
Figure 6D:
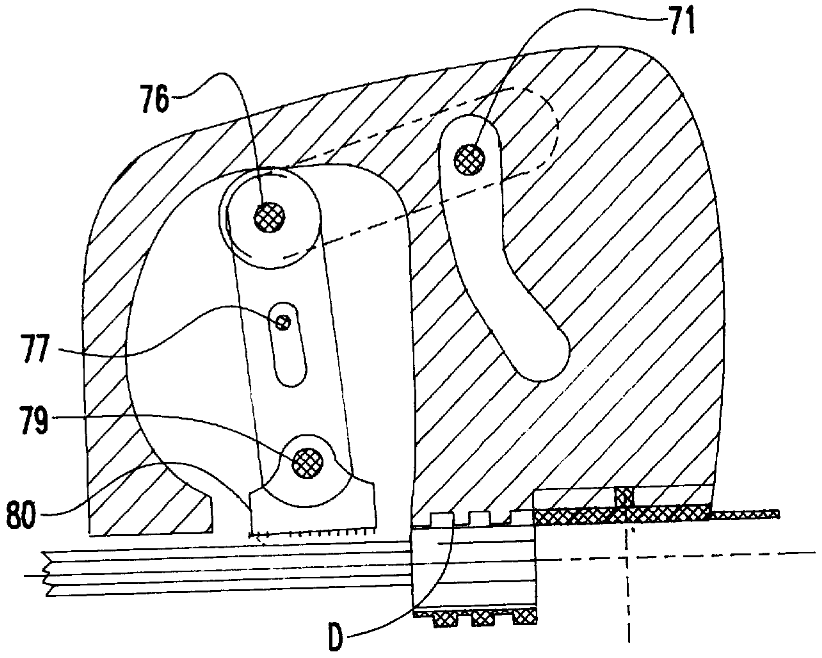

Also, it should be understood that the "plier-like" device might also include a mechanical capability to first grip the cable, and insert and seat it, by pulling, into the end of the coaxial cable connector before crimping occurs onto the exterior of the coaxial cable. An example of said mechanical seating/crimping device is shown in FIGS. 6*a* through 6*d*. FIGS. 6*b*–6*d* which are not to scale, show the top portion (only) of a two-sided plier device (the bottom jaw would be a mirror of the top) as seen in FIG. 6*a*. The device would provide a mechanical means by which closing the plier-like device (moving the handles toward each other) would, in sequence, begin in the "rest" position (6*a*), grip the cable (6*b*), seat the coaxial cable into the connector (6*c*), and then crimp the outer body onto the coaxial cable outer covering (6*d*). FIG. 6*a*, the "rest" position, shows the initial positions of the various parts of the seating/crimping device. A pin 71 at location "A" is resting at the bottom right of a guide slot 72 within the device head 70, and has the ability to traverse through said guide slot 72 as pressure is applied on the device handles, (FIGS. 7*a* and 7*b* ) during installation. The pin 71 also would be "fixed" relative to this closing motion imposed on the device heads during installation, possibly by another mechanical arm between the upper and lower heads' pins 71 (not shown), so as to provide positive force for movement of the pin 71. The pin 71 pin is also connected to a mechanical arm 73 which is further connected to a second mechanical arm 74 and roller cam 75 by a pin 76 at a second pin location B, as shown (all pins have non-rigid, rotating connections). The roller cam 75, which is cylindrical and concentric with the pin 76, has the capability to roll along a curvilinear path on the inside of the device head (said path could also be linear) as the pin 71 moves upward and left during connector installation, thereby forcing the roller cam 75 left and down. The pin 76 also passes through the second mechanical arm 74, with the second mechanical arm 74 having the capability to move about a fulcrum pin 77 installed in the head of the device, as well as up and down in accordance with a slot 78 in the second mechanical arm 74 around the fulcrum pin 77. This second mechanical arm 74 is connected at the end opposite to pin 74 with a flexibly-attached pin 79 (location "C") to a cable jaw 80 with cleats or teeth on its coaxial cable side, to better grip the cable's outer covering. Finally, each side of the device head has a means to use the guide lug of the cable connector outer body (e.g. connector lug 82) and has teeth 81 to crimp the connector body onto the cable's outer covering as vertical (closing) force is applied to the connector's outer body ends (shown at location "D" in FIG. 6*a*). In addition to guiding the device, the connector lug 82 further provides a fixed point, and stability, as lateral force is applied by the jaws of the device as it seats the coaxial cable into the connector.

Though this is only one of many possible methods for translating the closing motion of the plier handles into seating the cable into the connector and crimping the connector onto the cable outer covering, this embodiment, during installation, would use the motion of closing the plier handles (moving them toward each other) to, in turn, move the pin 71 up and left (drawing reference only). As this occurs, pin 76 and the roller cam 75 are forced to the left and down, along the curvilinear path, which then forces the second arm 74 to begin to move around the fulcrum pin 77 and downward (shown in FIG. 6*b*), with the jaw, or cleated "foot", resting on the outer covering of the cable. FIG. 6*c* shows that pin 71 has reached the left-most point of travel (location "E"), further displacing the first mechanical arm 73 left, which further displaces the roller cam 75 and the second mechanical arm 74 at the pin 76 left and down, again along the curved path. As this occurs, the second mechanical arm 74 rotates about the fulcrum pin 77 and then down, moving the cable jaw/foot to the right. This right-hand motion, in conjunction with the applied force and friction of the jaws/feet, force the cable into the connector body until it is fully seated. FIG. 6*d* shows the final motion of the pin 71 which is at the most vertical portion of its travel (e.g location "F"). As this motion occurs, the crimping teeth shown at location "D" have pressed against the outer portion of the connector body, deforming it onto the cable outer covering, creating the element-proof seal previously mentioned.

Finally, it should be understood that although three projections are shown on the jaw device, the number of these projections might be more or less and is a design option.

The Example below provides the approximate dimensions of a coaxial cable connector as depicted in FIG. 1. Depending on the application and needs of the user, the dimensions can be varied widely within the practice of this invention.

EXAMPLE

Overall length of the cable connector 10 is 2.000 inches.

Housing 12 length is 0.500 inches.

Protective sleeve 14 or 16 length is 0.625 inches.

Ends 18 and 20 of inner conductor connector 22 have a length of 0.750 inches.

The outer conductor connectors 38 and 40 have a length of 0.375 inches.

Inner diameter of inner conductor connector 22 is 0.031 inches.

Outer diameter of inner conductor connector 22 is tapered from 0.037 to 0.044 inches. Inner conductor connector alignment lug 25 diameter is 0.070 inches.

Inner diameter of outer conductor connector 38 or 40 is 0.150 inches. Outer diameter of outer conductor connector 38 or 40 is 0.156 inches.

Inner diameter of protective sleeve 14 or 16 is 0.284 inches. Outer diameter of protective sleeve 14 or 16 is 0.334 inches.

Diameter of housing 12 is 0.434 inches.

Diameter of alignment projection 60 is 0.600 inches.

Inner diameter on insulator body 23 is 0.044 inches. Outer diameter of insulator body 23 is 0.100 inches. Insulator 23 alignment lug diameter on head 24 is 0.125 inches.

While the invention has been described in terms of its preferred embodiments, it should be understood by those of skill in the art that the invention can be practiced with modification within the spirit and scope of the appended claims.

We claim:

1. A clamp for clamping coaxial cable connectors to coaxial cables, comprising:

means for gripping a cable and inserting a cable end of said cable into a sleeve of a cable connector, said gripping and inserting means including cable jaws, said gripping and inserting means moving said cable jaws sequentially in a direction substantially perpendicular to a length of said cable and in a direction substantially parallel to the length of said cable so as to grip and insert said cable into said sleeve, respectively, wherein said means for gripping and inserting is a first mechanical arm guided by a guide slot in a head device of said clamp and a second mechanical arm pivotally attached to said first arm at a pivot end thereof;

cam means for guiding said gripping and inserting means, wherein said cam means is a cam roller rotatably mounting said first mechanical arm to said second mechanical arm at the pivot end thereof, and which glides along a path defined by an edge portion of the head device; and means for crimping said sleeve of said cable connector to said cable.

2. The clamp of claim 1 further comprising:

a means for simultaneously actuating said means for gripping and said means for crimping to sequentially grip and insert said cable end into said cable connector and crimp said sleeve to said cable.

3. The clamp of claim 1 further comprising:

a means for aligning said means for crimping relative to said cable connector for crimping of said sleeve to said cable connector.

4. The clamp of claim 1 further comprising:

a means for aligning said means for gripping and inserting relative to said cable connector for gripping and inserting said cable end into said cable connector.

5. A clamp for claiming a coaxial cable connects to coaxial cables, comprising:

a pair of hinged handles;

a pair of opposing clamping surfaces connected to said pair of hinged handles, gripping and inserting means having cable jaws, said gripping and inserting means moving said cable jaws sequentially in a direction substantially perpendicular to a length of said coaxial cable and in a direction substantially parallel to the length of said coaxial cable, respectively, wherein said gripping and inserting means includes a first mechanical arm guided by a guide slot in a head device of said clamp and a second mechanical arm pivotally attached to said first arm at a pivot end thereof;

a cam roller rotatably mounting said first mechanical arm to said second mechanical arm at the pivot end thereof said cam roller glides along a path defined by an edge portion of said head device;

a plurality of projections on each of said opposing clamping surfaces for crimping a sleeve of said coaxial cable connector into said coaxial cable inserted into said sleeve by said gripping and inserting means; and means for aligning said opposing clamping surfaces relative to a coaxial cable connector.

6. The clamp of claim 5 wherein said means for aligning is an indentation in said opposing clamping surfaces.

7. The clamp of claim 5 further comprising means, operably connected to said pair of hinged handles, for gripping a cable and inserting a cable end of said cable into a sleeve of a cable connector.

8. The clamp of claim 5 wherein said means for gripping a cable and inserting a cable end of said cable into a sleeve of a cable connector includes a top cable jaw connected to a handle of said pair of hinged handles by said first mechanical arm, and a cam surface positioned to engage said first mechanical arm.

9. The clamp of claim 8 wherein said cable jaws further includes a bottom cable jaw connected to a bottom handle of said pair of hinged handles by said first mechanical arm.

* * * * *